US012412457B2

(12) United States Patent
Subramanian et al.

(10) Patent No.: US 12,412,457 B2
(45) Date of Patent: Sep. 9, 2025

(54) SCAN AVOIDANCE PREVENTION SYSTEM

(71) Applicant: Sensormatic Electronics, LLC, Boca Raton, FL (US)

(72) Inventors: Gopi Subramanian, Delray Beach, FL (US); Joseph Celi, Boca Raton, FL (US); Milton R. Navarro, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 789 days.

(21) Appl. No.: 17/557,936

(22) Filed: Dec. 21, 2021

(65) Prior Publication Data

US 2022/0198886 A1 Jun. 23, 2022

Related U.S. Application Data

(60) Provisional application No. 63/129,260, filed on Dec. 22, 2020.

(51) Int. Cl.
*G07G 1/00* (2006.01)
*G07G 3/00* (2006.01)
*G08B 13/196* (2006.01)

(52) U.S. Cl.
CPC ........... *G07G 1/0036* (2013.01); *G07G 3/003* (2013.01); *G08B 13/19613* (2013.01)

(58) Field of Classification Search
CPC .... G07G 1/0036; G07G 3/003; G07G 1/0054; G08B 13/19613
See application file for complete search history.

(56) References Cited

U.S. PATENT DOCUMENTS

| | | | | | |
|---|---|---|---|---|---|
| 1,872,307 | A * | 8/1932 | Lehman | E02F 9/2825 | 37/450 |
| 7,429,000 | B1 * | 9/2008 | Ott | G06K 7/10881 | 235/383 |
| 7,448,542 | B1 * | 11/2008 | Bobbitt | G06Q 20/208 | 235/383 |
| 8,448,858 | B1 * | 5/2013 | Kundu | G07G 3/003 | 235/383 |
| 8,448,859 | B2 * | 5/2013 | Goncalves | G07G 1/0054 | 235/383 |
| 8,462,212 | B1 * | 6/2013 | Kundu | G07G 1/0081 | 348/150 |

(Continued)

*Primary Examiner* — Michael Jared Walker
(74) *Attorney, Agent, or Firm* — ArentFox Schiff LLP

(57) ABSTRACT

Example aspects include a method, apparatus and computer-readable medium of determining losses at a point of sale (POS) device, comprising receiving, by a processor from an imaging device, a video feed of a scanning area. The aspects further include detecting, by the processor, an entry of an item into the scanning area. Additionally, the aspects further include identifying, by the processor, one or more motion parameters of the item. Additionally, the aspects further include determining, by the processor, a dwell-time for the item based at least on the one or more motion parameters. Additionally, the aspects further include identifying, by the processor, a scan time anomaly for the item. Additionally, the aspects further include outputting a notification, by the processor, indicating a suspicious activity for the item, wherein the notification indicating the suspicious activity is based on the scan time anomaly.

24 Claims, 7 Drawing Sheets

(56) References Cited

U.S. PATENT DOCUMENTS

| | | | | | |
|---|---|---|---|---|---|
| 8,570,375 | B1 * | 10/2013 | Srinivasan | H04N 7/181 235/383 |
| 8,700,230 | B1 * | 4/2014 | Hannah | B62B 5/0003 340/568.5 |
| 8,833,653 | B2 * | 9/2014 | Kundu | G06Q 20/4016 235/383 |
| 9,892,438 | B1 * | 2/2018 | Kundu | G06Q 30/0609 |
| 10,115,023 | B2 * | 10/2018 | Kundu | G06Q 30/0185 |
| 10,242,267 | B2 * | 3/2019 | Fan | G07G 1/0036 |
| 10,796,305 | B1 * | 10/2020 | Farrow | G06Q 20/202 |
| 2001/0049690 | A1 * | 12/2001 | McConnell | G07G 1/14 |
| 2008/0018738 | A1 * | 1/2008 | Lipton | G06V 20/52 348/E7.087 |
| 2018/0096567 | A1 * | 4/2018 | Farrow | G06V 40/161 |
| 2018/0096576 | A1 * | 4/2018 | Anderholm | G01S 13/886 |
| 2019/0096220 | A1 * | 3/2019 | Anderholm | G08B 21/0476 |
| 2019/0244451 | A1 * | 8/2019 | Favier | E05B 73/0052 |
| 2019/0258870 | A1 * | 8/2019 | Kundu | G06V 20/41 |
| 2019/0378389 | A1 * | 12/2019 | Altuev | G08B 13/19656 |
| 2020/0079412 | A1 * | 3/2020 | Ramanathan | G08B 13/19602 |
| 2020/0234056 | A1 * | 7/2020 | Pricochi | G07G 1/0063 |
| 2020/0279310 | A1 * | 9/2020 | Kundu | G07G 1/0036 |
| 2021/0065152 | A1 * | 3/2021 | Oshima | H04W 4/80 |
| 2021/0117949 | A1 * | 4/2021 | Guo | G06T 7/70 |
| 2023/0013957 | A1 * | 1/2023 | Farrow | G07G 3/003 |

* cited by examiner

SCAN AVOIDANCE PREVENTION SYSTEM

CROSS REFERENCE TO RELATED APPLICATIONS

The present application claims priority to U.S. Provisional Application No. 63/129,260, filed Dec. 22, 2020.

TECHNICAL FIELD

The described aspects relate to point of sale (POS) systems and more specifically to loss prevention due to real time visual scan avoidance prevention system for point of sale (POS) stations.

BACKGROUND

POS systems are usually prone to sweet heartening, i.e., collusion between a retail store personnel and a customer to check out items without scanning, or scanning fewer than all paid for items, through the POS system, resulting in the customer not paying for the item or paying for fewer items than the checked out items.

Typical scan avoidance monitoring systems would involve monitoring a video recording of a transaction and identifying losses due to sweet heartening. However, such a detection of sweet heartening via a video recording occurs after the item has already been checked out, thereby resulting in losses for a store owner or a retailer.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of determining losses at a point of sale (POS) device, comprising receiving, by a processor from an imaging device, a video feed of a scanning area. The method further includes detecting, by the processor, an entry of an item into the scanning area. Additionally, the method further includes identifying, by the processor, one or more motion parameters of the item. Additionally, the method further includes determining, by the processor, a dwell-time for the item based at least on the one or more motion parameters. Additionally, the method further includes identifying, by the processor, a scan time anomaly for the item. Additionally, the method further includes outputting a notification, by the processor, indicating a suspicious activity for the item, wherein the notification indicating the suspicious activity is based on the scan time anomaly.

Another example aspect includes an apparatus for determining losses at a point of sale (POS) device, comprising a memory and a processor communicatively coupled with the memory. The processor is configured to receive, from an imaging device, a video feed of a scanning area. The processor is further configured to detect an entry of an item into the scanning area. Additionally, the processor further configured to identify one or more motion parameters of the item. Additionally, the processor further configured to determine a dwell-time for the item based at least on the one or more motion parameters. Additionally, the processor further configured to identify a scan time anomaly for the item. Additionally, the processor further configured to output a notification indicating a suspicious activity for the item, wherein the notification indicating the suspicious activity is based on the scan time anomaly.

Another example aspect includes a computer-readable medium storing instructions for determining losses at a point of sale (POS) device, wherein the instructions are executable by a processor to receive, from an imaging device, a video feed of a scanning area. The instructions are further executable to detect, by the processor, an entry of an item into the scanning area. Additionally, the instructions are further executable to identify, by the processor, one or more motion parameters of the item. Additionally, the instructions are further executable to determine, by the processor, a dwell-time for the item based at least on the one or more motion parameters. Additionally, the instructions are further executable to identify, by the processor, a scan time anomaly for the item. Additionally, the instructions are further executable to output a notification, by the processor, indicating a suspicious activity for the item, wherein the notification indicating the suspicious activity is based on the scan time anomaly.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As discussed above, in current scan avoidance monitoring systems at POS stations, sweet heartening is typically detected after the item has already been checked out by review a video recording of a previously-occurring transaction. A scan avoidance prevention system in accordance with aspects of the present disclosure operate in real-time, and may utilize a computer vision pipeline and machine learning models for implementing techniques that may detect item level scan avoidance. For example, in an aspect, items may be tracked across a region of interest (ROI) as they pass across a scanner. Object detection may be used to detect the myriad of items passing by and each unique item may be identified and counted. The item trajectory with respect to path and velocity may be utilized in an anomaly detection algorithm to flag one or more suspicious events (e.g., events in which it is suspected that an item has been checked out without being scanned).

In an further optional or additional aspect, the scan avoidance prevention system in accordance with the present disclosure may utilize a multilevel transaction interval. The transaction interval may start when the first item may be scanned by the customer. The transaction interval may end once the last item may be scanned. Within a top level (or overall) transaction interval there may be secondary item level transactions, one for each item that may be tracked. As such, the system may additionally track one or more secondary item transaction intervals.

Also, in another optional or additional aspect, the scan avoidance prevention system of the present disclosure may utilize a camera monitoring an item scanning area. The camera configuration may be configured to define and optimize the view of the item scanning area. In some cases, for example, a video stream resolution and a frame rate may be specified for the camera.

Further, in an optional or additional aspect, the scan avoidance prevention system may gather analytics information at a video frame level and the analytics information may be saved to a server for further processing. The scan avoidance prevention system may process the analytics information, identify anomalies and then display or output real-time analytics on a monitor and/or also store the information about anomalies in a database. Data from the database may be exported via a presentation layer or obtained directly from the database for off-line analysis.

Figure 1:
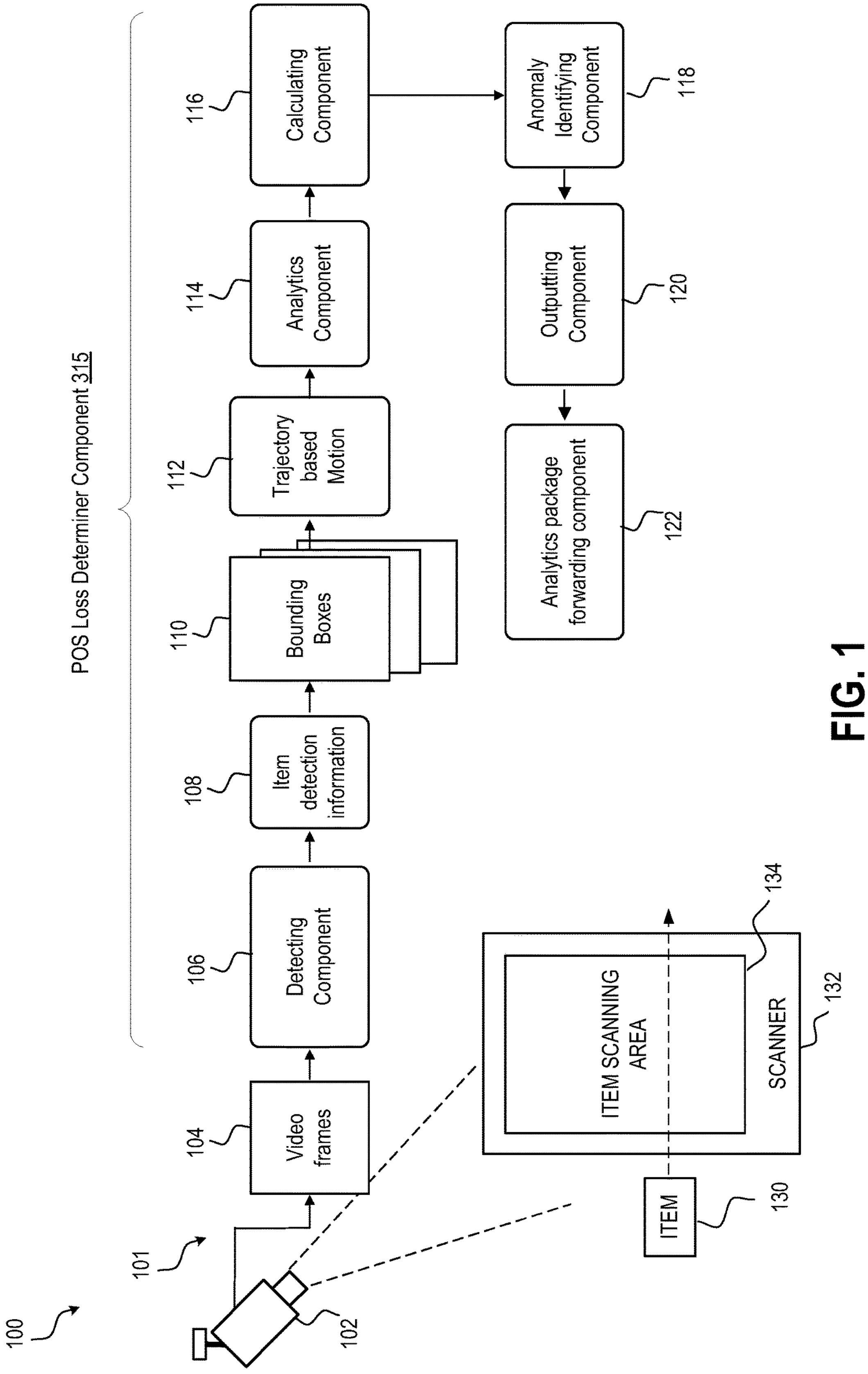
FIG. 1 is a schematic diagram of an example scan avoidance prevention system in accordance with aspects of the present disclosure.

Referring to FIG. 1, an example of the scan avoidance prevention system 100 includes a point of sale (POS) loss determiner component 315 configured to detect and generate notifications of actions associated with avoiding scanning an item 130 through a scanner 132, such as may be associated with purchasing an item at a POS station. The POS loss determiner component 315 includes an example computer vision pipeline 101 that receives video frames 104 from a camera 102 that captures a video stream of an item scanning area 134 of the scanner 132, including video frames 104 which may include images of the item 130, such as a retail items for sale, captured by the camera 102. A detecting component 106 may analyze the video frames 104 to detect an entry and/or presence of the item 130, and/or any other object, into the item scanning area 134. For example, the detecting component 106 may utilize an artificial intelligence (AI) or a machine learning (ML) technique(s) to detect the entry of the item 130 into the item scanning area 134. Item detection information 108 may include one or more parameters of the detected item, e.g., a size of the item, an approximate shape and/or weight of the item, a type of the item, etc. One or more bounding boxes 110 may be used to separate each item to enable correlation of the item detection information 108 with one or more other parameters/information (e.g., a category of the item, a brand of the item, a composition of the item, etc.) to package the information in an information package. A trajectory based motion component 112 may define information about a path trajectory of the item and/or a velocity of the item, etc., which may be added/appended to the information package. An analytics component 114 may analyze the information in the information package to identify and extract relevant information concerning the item 130. The analytics component 114 may also correlate the information about one or more parameters of the item 130 included in the information package to determine analytics information (e.g., the time spent in the scanning area by the item based on the motion parameters of the item) for determining a dwell-time for the item 130. A calculating component 116 may calculate a dwell-time for the item 130. For example, the calculating component 116 may determine the dwell-time as a time duration corresponding to when the item 130 moves across the item scanning area 134, alone or in parallel with one or more other items (e.g., in a manner where one item blocks another item from being scanned) in the item scanning area 130, based on the analytics information received from the analytics component 114. An anomaly identifying component 118 may identify a scan time anomaly for the item 130. For example, the anomaly identifying component 118 may compare the dwell-time for the item 130 against a dwell-time threshold. In an example, the dwell-time threshold may be based on historic dwell-time data for the same item or a similar item (e.g., a similar size, similar shape, similar category/type, similar material/composition, similar weight, etc., and/or based on an identifier of a person operating a POS station at which the item is scanned, as different operators may work at different speeds). The anomaly identifying component 118 may detect a scan time anomaly when the dwell-time for the item 130 is greater than the dwell-time threshold. An outputting component 120 may output a notification indicating a suspicious activity associated with the scanning of the item 130. For example the outputting component 120 may include a monitor, a speaker, a light, or any other type of audio and/or visual alert system, and/or a message transmitting system, such as for sending an e-mail or a text message to another device (e.g., to notify store management or security). The notification output by the outputting component 120 may include information that indicates a suspicious activity based on the scan time anomaly identified by the anomaly identifying component 118. In an alternative or additional aspect, an analytics package forwarding component 122 may forward the analytics information, the dwell-time for the item 130, one or more scan time anomalies identified for the item 130 to a database or memory for storing such information about the item 130.

In one aspect, the anomaly identifying component 118 may determine a frequency of scan time anomalies among a plurality of POS transactions based on a category of the item 130 corresponding to the scan time anomalies. The anomaly identifying component 118 may then identify an aisle or a geographical area of a store corresponding to the category of the item 130, and send the information about the aisle or the geographical area to the outputting component 120 and the analytics package forwarding component 122. The anomaly identifying component 118 may also determine a customer identification of a customer associated with a POS transaction corresponding to a scan time anomaly. For example, the anomaly identifying component 118 may identify the customer based on a customer identifier stored in a database, a facial recognition of the customer based on video feed received from the camera 102 or any other cameras monitoring the POS station. The anomaly identifying component 118 may send the instructions to the outputting component 120 to generate a second notification indicating a presence of the customer in one or more areas of the store (e.g., the aisle or geographical area of the store identified by the anomaly identifying component 118). The anomaly identifying component 118 may also send the customer identification information of the customer to the analytics package forwarding component 122 for storing the customer identification information in a database.

Figure 2:
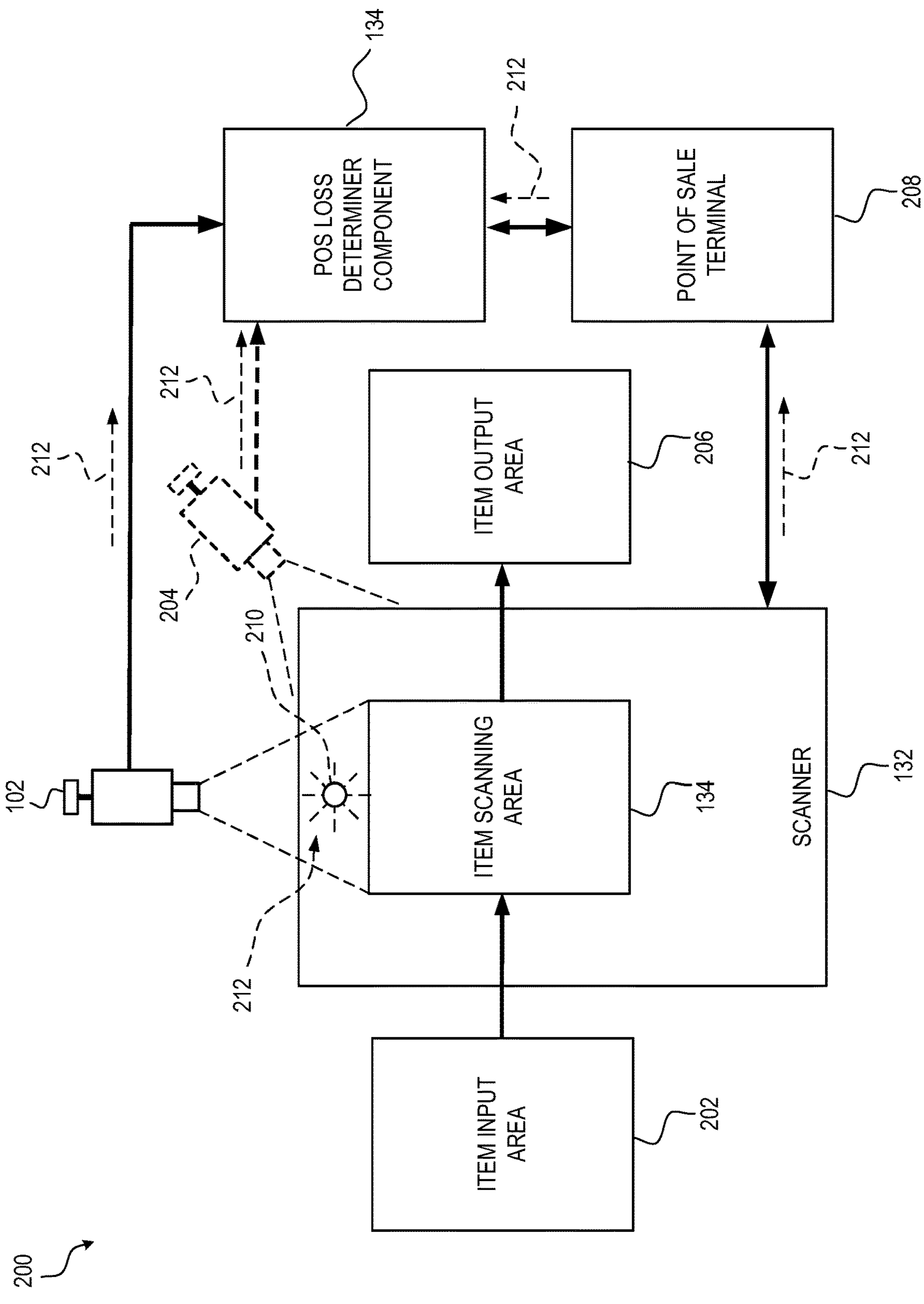
FIG. 2 is a block diagram of an example scan avoidance prevention system in accordance with aspects of the present disclosure.

Referring to FIG. 2, an example of the scan avoidance prevention system 100 (FIG. 1) implemented at a point of sale station 200 includes the camera 102 (as described above with reference to FIG. 1) that monitors at least an item scanning area 134 of a scanner 132 associated with a point of sale (POS) terminal 208, and, optionally, also an item input area 202 and/or an item output area 206. The combination of the scanner 132 and the POS terminal 208, and optionally the item input area 202 and/or the item output area 206, may be referred to as a POS station 200. The item scanning area 134 (and, optionally, the item input area 202 and/or the item output area 206) may be rectangular, triangular, circular, or an area of any other shape based on the design of a POS station 200, which the camera 102 may monitor. The item input area 202 is an area where one or more items (e.g., item 130, FIG. 1) may be input or placed prior to scanning. For example, the item input area 202 may be a shelf or belt adjacent to the item scanning area 134, an area for customers to park a shopping cart for presenting items for checkout at the POS station 200, or any other similar area. The item output area 206 may be an area where the items are placed after scanning of the items through the POS station 200. The scanner 132 may be any type of input device capable of reading and decoding information on an item for sale. For example, information readable and decodable by the scanner 132 may include, but is not limited to, a barcode and/or a quick response (QR) code. The POS terminal 208 may include any device capable of performing a retail transaction, such as a computer device having a memory, processor, one or more user interfaces, and one or more communication interfaces. The POS terminal 208 may be capable of receiving inputs from the scanner 132 or another input device, such as a keyboard, calculating an amount of money owed for items that are scanned or otherwise input for purchase, a display or other output device (such as a speaker) for presenting an amount owed to a customer, and a card reading device for obtaining credit or debit card information and performing a transaction to confirm payment of the item(s).

The point of sale station 200 further includes the POS loss determiner component 134, which may be implemented by the point of sale terminal 208 and/or by another computer device in communication with the point of sale terminal 208. As noted above, the POS loss determiner component 134 is additionally in communication with the camera 102, or an intermediary device or network, for receiving the video frames 104 (FIG. 1) associated with the item scanning area 134. The POS loss determiner component 134 may operate as described above with respect to FIG. 1, including: calculating the dwell-time, such as corresponding to an amount of time between a first time corresponding to the entry of an item (e.g., item 130 of FIG. 1) into the item scanning area 134 from the item input area 202 and a second time corresponding to the item leaving the item scanning area 134 to the item output area 206; identifying whether a scan time anomaly exists for the item; and, if so, generating a notification indicating a suspicious activity for the item.

In an alternative or additional aspect, a plurality of items may be present in the item input area 202, the item scanning area 134, and/or the item output area 206. The detecting component 106 may detect an item from the plurality of items based on the video frames 104 captured by the camera 102. The analytics component 114 may assign an item identifier (e.g. a unique identifier for the item) to the item upon the detection of the entry of the item into the item scanning area 134. The calculating component 116 may determine an item count of the plurality of items based on the item identifier assigned by the analytics identifying component 118 to each of the plurality of items. The calculating component 116 may also determine the item count based on the POS transaction. In some optional or additional aspects, for example, point of sale station 200 may include a second camera 204 having a field of view covering the item scanning area 134 and capable of providing additional video frames 104 to the POS loss determiner component 134. The second camera 204 may be positioned to monitor the item scanning area from a different angle as compared to the camera 102. The second camera 204, alone or in combination with the camera 102, may allow the POS loss determiner component 134 to detect items being moved through the item scanning area 134 in parallel, e.g., in a manner where one item blocks another item from being scanned. After determining the item count, the calculating component 116 may determine a dwell-time for the item as a total dwell-time for the plurality of the items divided by the item count.

In an alternative or additional aspect, the scanner 132 is further configured to generate a synchronization signal 212 to confirm when an item in the item scanning area 134 has been scanned. For example, the synchronization signal 132 may include a synchronization signal message transmitted from the scanner 132 to the point of sale terminal 208 and/or the POS loss determiner component 134 upon occurrence of a successful scan. In an alternative or additional example, the synchronization signal 132 may include a sensor-detectable output generated by the scanner 132. For instance, the sensor detectable output may be a light emission from a lighting device 210 of the scanner 132, e.g., a color light emitting diode being energized and emitting light. The sensor-detectable output may be captured by the image sensor or camera 102 (and/or 104) and thus may be detected by the detecting component 106 of the POS loss determiner component 315. In this case, the anomaly identifying component 118 is further configured to check for presence of the synchronization signal 212 from the scanner 132 based on the entry of the item into the item scanning area 134, and to generate the scan time anomaly based on lack of detection of the synchronization signal.

Figure 3:
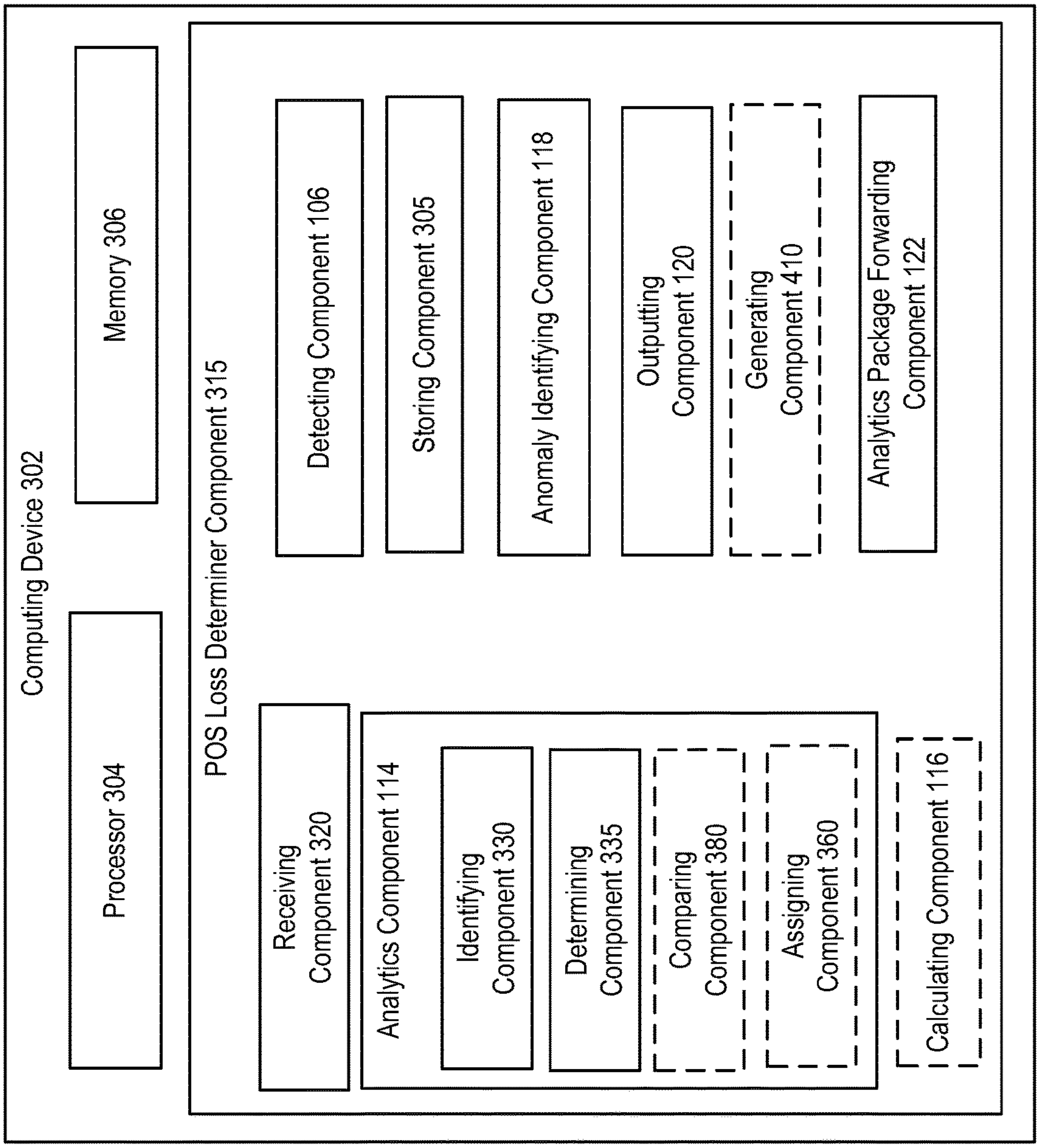
FIG. 3 is a block diagram of an example of a hardware aspect for a scan avoidance prevention device in accordance with various aspects of the present disclosure.
Figure 4:
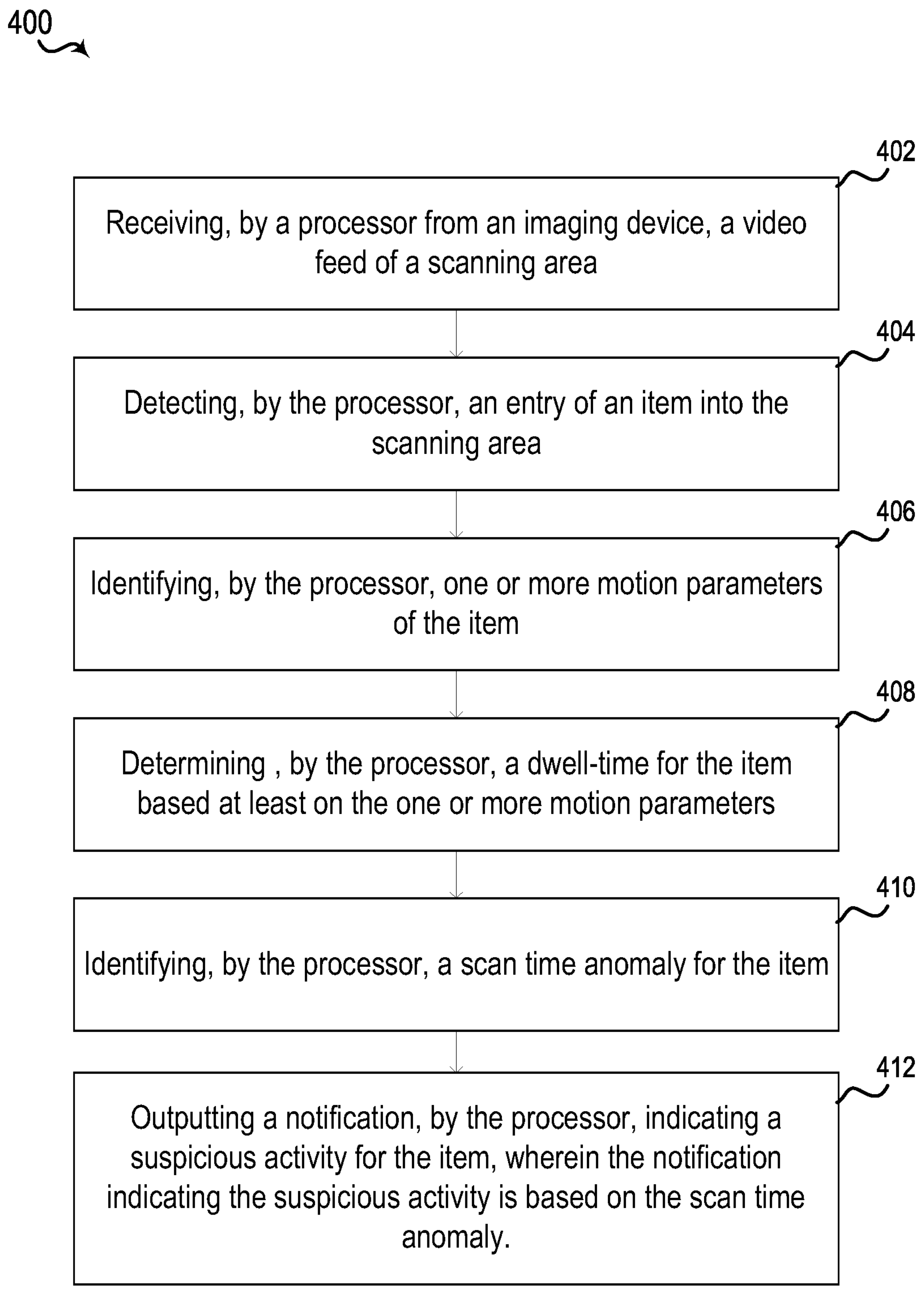
FIG. 4 is a flowchart of an example method for a scan avoidance prevention system that allows indicating a suspicious activity at a POS station.

Referring to FIG. 3 and FIG. 4, in operation, a computing device 302 may perform a method 400 of determining losses at a point of sale (POS) device, such as via execution of instructions stored in a POS loss determiner component 315 by a processor 304 and/or a memory 306 communicatively coupled to the processor 304. The computing device 302 may be the point of sale terminal 208 (FIG. 2) in communication with the camera(s) 102 (and/or 204), or may be another computing device 302 in communication with the camera(s) 102 (and/or 204) and/or the point of sale terminal 208.

At block 402, the method 400 includes receiving, by a processor from an imaging device, a video feed of a scanning area. For example, in an aspect, the computing device 302, the processor 304, the memory 306, the POS loss determiner component 315, and/or the receiving component 320 may be configured to or may comprise means for receiving, from the camera 102 (as described above with reference to FIGS. 1 and 2), a video feed of the item scanning area 134. For example, the receiving at block 402 may include receiving a video stream captured by the camera 102, as described above.

At block 404, the method 400 includes detecting, by the processor, an entry of an item into the scanning area. For example, in an aspect, computing device 302, the processor 304, the memory 306, the POS loss determiner component 315, and/or the detecting component 106 may be configured to or may comprise means for detecting an entry of an item into the scanning area. For example, the detecting at block 404 may include detecting change in the visuals of the video frames 104 captured by the camera 102, as described above.

At block 406, the method 400 includes identifying, by the processor, one or more motion parameters of the item. For example, in an aspect, the computing device 302, the processor 304, the memory 306, the POS loss determiner component 315, and/or the identifying component 330 may be configured to or may comprise means for identifying one or more motion parameters of the item. In an aspect, for example, the one or more motion parameters of the item may include a path trajectory of the item or a velocity of the item. For example, the identifying at block 406 may include identifying the motion parameters based on the trajectory based motion 112 of the item as described above with reference to FIG. 1.

At block 408, the method 400 includes determining, by the processor, a dwell-time for the item based at least on the one or more motion parameters. For example, in an aspect, the computing device 302, the processor 304, the memory 306, the POS loss determiner component 315, and/or the determining component 335 may be configured to or may comprise means for determining a dwell-time for the item based at least on the one or more motion parameters. For example, in one aspect, the determining at block 408 may include determining the dwell-time as an amount of time between a first time corresponding to the detecting of the entry of the item into the scanning area and a second time corresponding to detecting the item leaving the scanning area as described above with reference to FIGS. 1 and 2.

At block 410, the method 400 includes identifying, by the processor, a scan time anomaly for the item. For example, in an aspect, the computing device 302, the processor 304, the memory 306, the POS loss determiner component 315, and/or the anomaly identifying component 118 may be configured to or may comprise means for identifying a scan time anomaly for the item, as described above with reference to FIGS. 1-2.

At block 412, the method 400 includes outputting a notification, by the processor, indicating a suspicious activity for the item, wherein the notification indicating the suspicious activity is based on the scan time anomaly. For example, in an aspect, the computing device 302, the processor 304, the memory 306, the POS loss determiner component 315, and/or the outputting component 120 may be configured to or may comprise means for outputting a notification indicating a suspicious activity for the item, wherein the notification indicating the suspicious activity is based on the scan time anomaly, as described above with reference to FIGS. 1 and 2.

Figure 5:
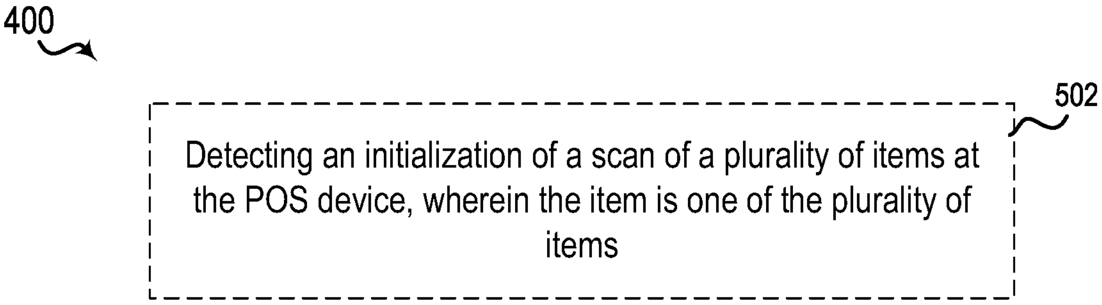
FIG. 5 is a flowchart of an example method for an optional detection technique for the scan avoidance prevention system of the present disclosure.

Referring to FIG. 5, in an optional aspect, at block 502, the method 400 may further include detecting an initialization of a scan of a plurality of items at the POS device, wherein the item is one of the plurality of items. For example, in an aspect, the computing device 302, the processor 304, the memory 306, the POS loss determiner component 315, and/or the detecting component 106 may be configured to or may comprise means for detecting an initialization of a scan of a plurality of items at the POS device, wherein the item is one of the plurality of items, as described above with reference to FIGS. 1 and 2.

Figure 6:
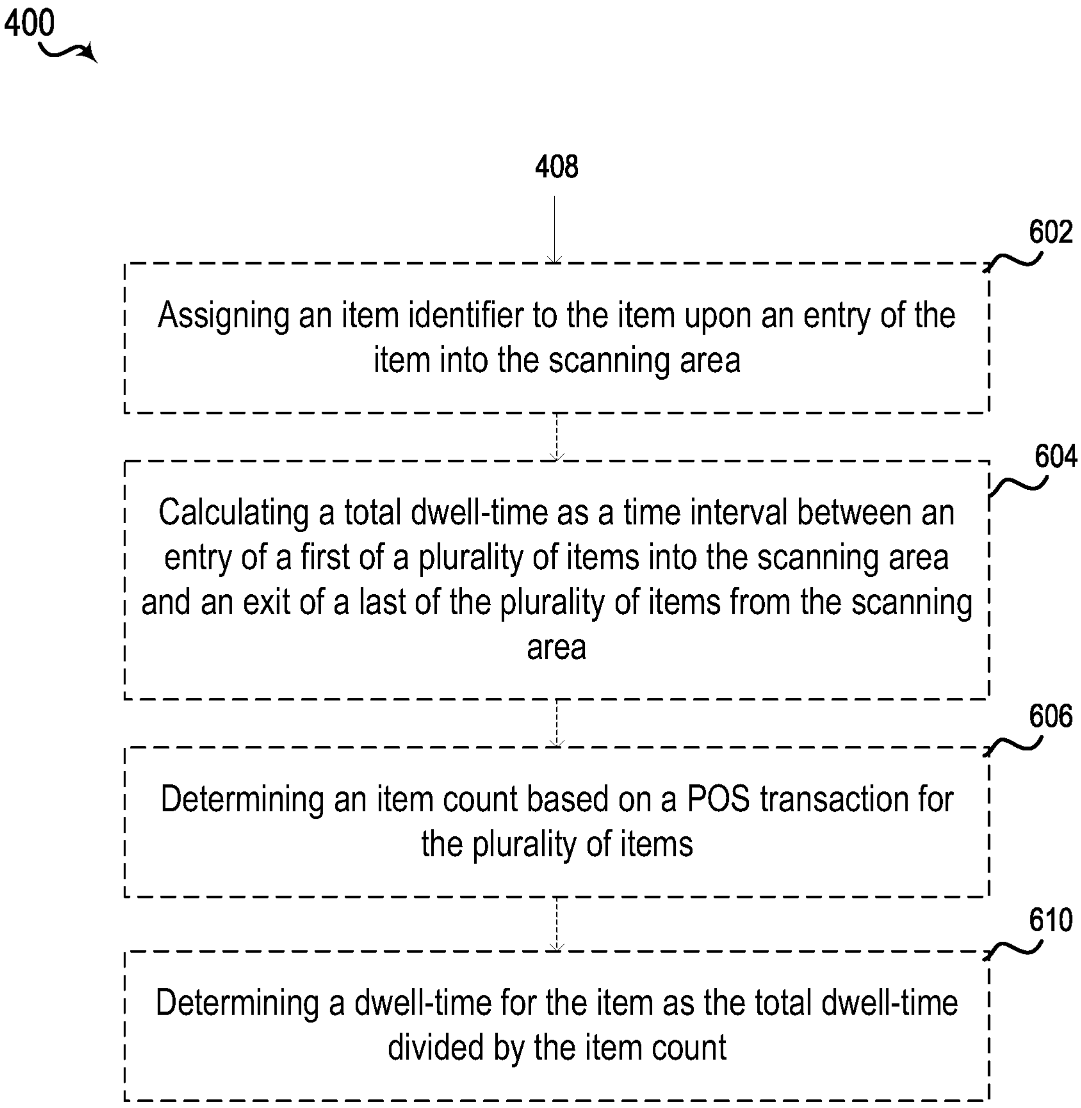
FIG. 6 is a flowchart of an example method for an optional dwell-time determination technique for the scan avoidance prevention system of the present disclosure.

Referring to FIG. 6, in another optional aspect, the determining the dwell-time for the item at block 408 of the method 400 may further include, at block 602, assigning an item identifier to the item upon an entry of the item into the scanning area. For example, in an aspect, the computing device 302, the processor 304, the memory 306, the POS loss determiner component 315, and/or an assigning component 360 may be configured to or may comprise means for assigning an item identifier to the item upon an entry of the item into the scanning area, as described above with reference to FIGS. 1 and 2.

In this optional aspect, at block 604, the method 400 may further include calculating a total dwell-time as a time interval between an entry of a first of a plurality of items into the scanning area and an exit of a last of the plurality of items from the scanning area. For example, in an aspect, the computing device 302, the processor 304, memory 306, the POS loss determiner component 315, and/or the calculating component 116 may be configured to or may comprise means for calculating a total dwell-time as a time interval between an entry of a first of a plurality of items into the scanning area and an exit of a last of the plurality of items from the scanning area, as described above with reference to FIGS. 1 and 2.

In this optional aspect, at block 606, the method 400 may further include determining an item count based on a POS transaction for the plurality of items. For example, in an aspect, the computing device 302, the processor 304, the memory 306, the POS loss determiner component 315, and/or the calculating component 116 may be configured to or may comprise means for determining the item count based on the POS transaction for the plurality of items, as described above with reference to FIGS. 1 and 2.

In this optional aspect, at block 610, the method 400 may further include determining a dwell-time for the item as the total dwell-time divided by the item count. For example, in an aspect, the computing device 302, the processor 304, the memory 306, the POS loss determiner component 315, and/or the calculating component 116 may be configured to or may comprise means for determining a dwell-time for the item as the total dwell-time divided by the item count, as described above.

Figure 7:
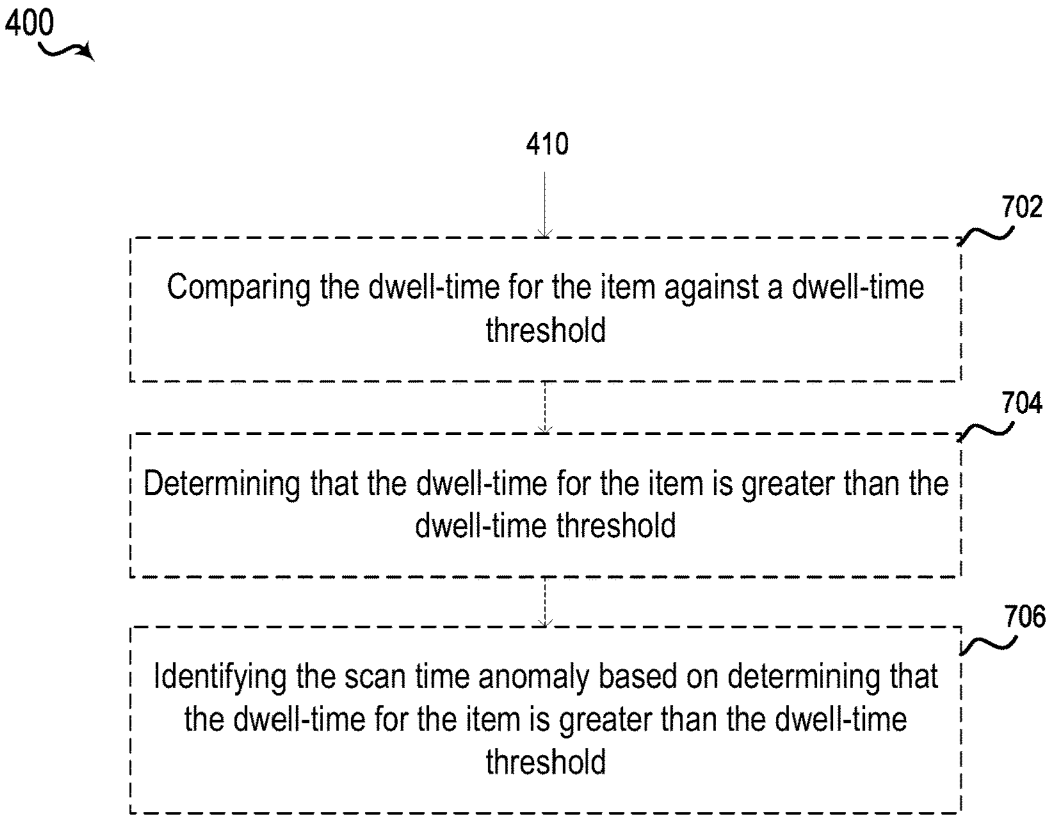
FIG. 7 is a flowchart of an example method for an optional scan time anomaly determination technique for the scan avoidance prevention system of the present disclosure.

Referring to FIG. 7, in another optional aspect, at block 702, the identifying the scan anomaly at block 410 of the method 400 may further include comparing the dwell-time for the item against a dwell-time threshold. For example, in an aspect, the computing device 302, the processor 304, the memory 306, the POS loss determiner component 315, and/or a comparing component 380 may be configured to or may comprise means for comparing the dwell-time for the item against a dwell-time threshold. In an aspect, the dwell-time threshold is based on one or a combination of a type or category of the item, a size of the item, a weight of the item, or an identifier of a person operating the POS. In one aspect, the comparing component 380 may be included in the anomaly identifying component 118, or alternately the anomaly identifying component 118 may include instructions which when executed by the processor 304 to perform the operations at block 702.

In this optional aspect, at block 704, the method 400 may further include determining that the dwell-time for the item is greater than the dwell-time threshold. For example, in an aspect, the computing device 302, the processor 304, the memory 306, the POS loss determiner component 315, and/or the anomaly identifying component 118 may be configured to or may comprise means for determining that the dwell-time for the item is greater than the dwell-time threshold, as described above with reference to FIGS. 1 and 2.

In this optional aspect, at block 706, the method 400 may further include identifying the scan time anomaly based on determining that the dwell-time for the item is greater than the dwell-time threshold. For example, in an aspect, the computing device 302, the processor 304, the memory 306, the POS loss determiner component 315, and/or the anomaly identifying component 118 may be configured to or may comprise means for identifying the scan time anomaly based on determining that the dwell-time for the item is greater than the dwell-time threshold, as described above with reference to FIGS. 1 and 2.

Figure 8:
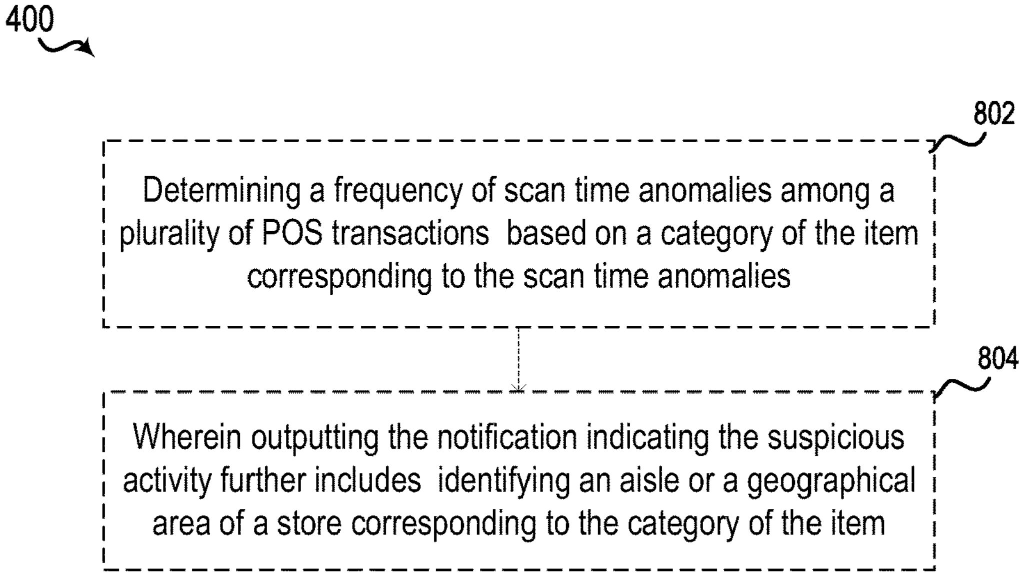
FIG. 8 is a flowchart of an example method for an optional notification technique indicating a geographical area corresponding to scan time anomalies for the scan avoidance prevention system of the present disclosure.

Referring to FIG. 8, in another optional aspect, the method 400 may further include, at block 802, determining a frequency of scan time anomalies among a plurality of POS transactions based on a category of the item corresponding to the scan time anomalies. For example, in an aspect, the computing device 302, the processor 304, the memory 306, the POS loss determiner component 315, and/or the anomaly identifying component 118 may be configured to or may comprise means for determining a frequency of scan time anomalies among a plurality of POS transactions based on a category of the item corresponding to the scan time anomalies, as described above with reference to FIGS. 1 and 2.

In this optional aspect, at block 804, the method 400 may further include wherein outputting the notification indicating the suspicious activity at block 412 further includes identifying an aisle or a geographical area of a store corresponding to the category of the item. For example, in an aspect, the computing device 302, the processor 304, the memory 306, the POS loss determiner component 315, and/or the outputting component 120 may be configured to or may comprise means for outputting the notification identifying an aisle or a geographical area of a store corresponding to the category of the item, as described above with reference to FIGS. 1 and 2.

Figure 9:
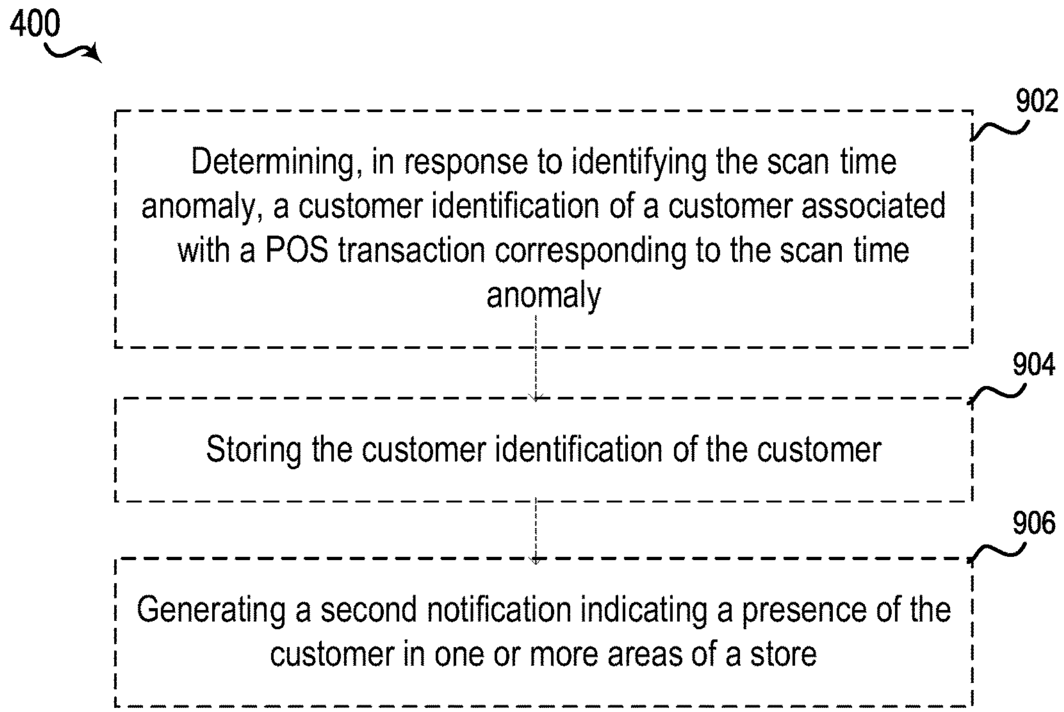
FIG. 9 is a flowchart of an example method for an optional notification technique indicating a presence of a customer in one or more areas for the scan avoidance prevention system of the present disclosure.

Referring to FIG. 9, in an optional aspect, the method 400 may further include, at block 902, determining, in response to identifying the scan time anomaly, a customer identification of a customer associated with a POS transaction corresponding to the scan time anomaly. For example, in an aspect, the computing device 302, the processor 304, the memory 306, the POS loss determiner component 315, and/or the anomaly identifying component 118 may be configured to or may comprise means for determining, in response to identifying the scan time anomaly, the customer identification of the customer associated with the POS transaction corresponding to the scan time anomaly, as described above with reference to FIGS. 1 and 2.

In this optional aspect, at block 904, the method 400 may further include storing the customer identification of the customer. For example, in an aspect, the computing device 302, the processor 304, the memory 306, the POS loss determiner component 315, the analytics package forwarding component 122, and/or a storing component 305 may be configured to or may comprise means for storing the customer identification of the customer, as described above with reference to FIGS. 1 and 2.

In this optional aspect, at block 906, the method 400 may further include generating a second notification indicating a presence of the customer in one or more areas of a store. For example, in an aspect, the computing device 302, the processor 304, the memory 306, the POS loss determiner component 315, and/or the outputting component 120 may be configured to or may comprise means for generating a second notification indicating a presence of the customer in one or more areas of a store, as described above with reference to FIGS. 1 and 2.

Figure 10:
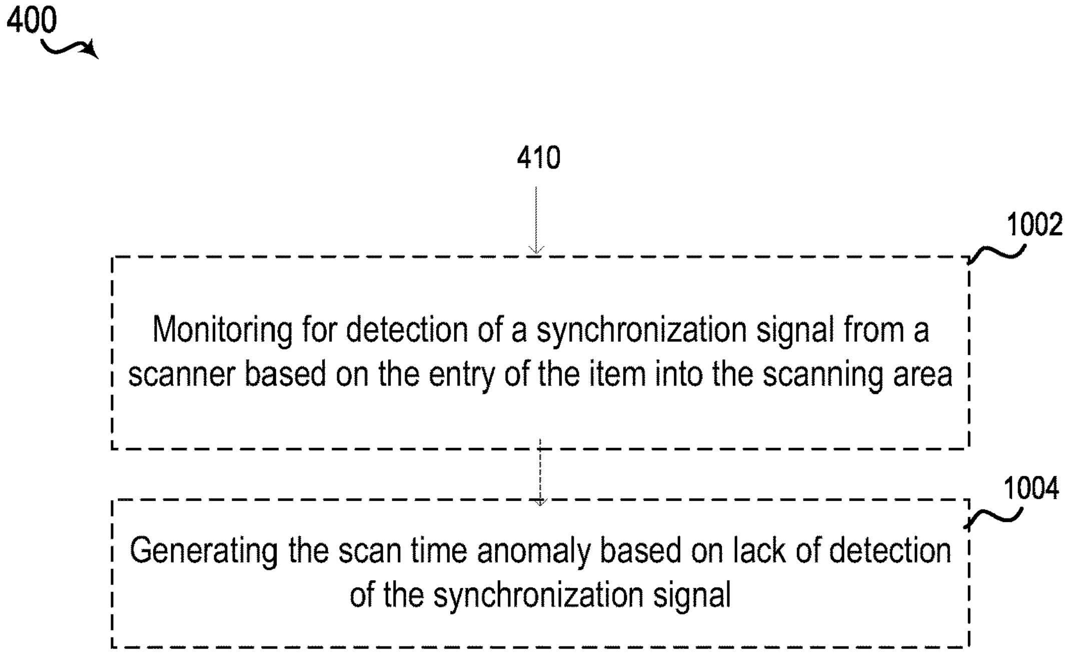
FIG. 10 is a flowchart of an example method for an optional scan time anomaly determination technique for the scan avoidance prevention system of the present disclosure.

Referring to FIG. 10, in another optional aspect, at block 1002, the identifying the scan anomaly at block 410 of the method 400 may further include monitoring for detection of a synchronization signal from a scanner based on the entry of the item into the scanning area. For example, in an aspect, the computing device 302, the processor 304, the memory 306, the POS loss determiner component 315, and/or the anomaly identifying component 118 may be configured to or may comprise means for monitoring for detection of a synchronization signal from a scanner based on the entry of the item into the scanning area. In an aspect, the synchronization signal may include at least one of a detected light emission or a synchronization signal message from the scanner. Consequently, the monitoring may include an imaging device, such as the camera 102 and/or 204, capturing an image frame including a sensor-detectable output, e.g., a light emission, or the point of sale terminal 208 or the POS loss determiner component receiving a synchronization signal message from the scanner, as described above with respect to FIG. 2.

In this optional aspect, at block 1004, the method 400 may further include generating the scan time anomaly based on lack of detection of the synchronization signal. For example, in an aspect, the computing device 302, the processor 304, the memory 306, the POS loss determiner component 315, and/or the anomaly identifying component 118 may be configured to or may comprise means for generating the scan time anomaly based on lack of detection of the synchronization signal. For instance, when the synchronization signal is not detected, then the anomaly identifying component 118 will generate the scan time anomaly as described above with respect to FIGS. 1 and 2, resulting in outputting of the notification indicating the suspicious activity.

Additional implementations may include one or more of the following aspects.

1. A method of determining losses at a point of sale (POS) device, comprising: receiving, by a processor from an imaging device, a video feed of a scanning area; detecting, by the processor, an entry of an item into the scanning area; identifying, by the processor, one or more motion parameters of the item; determining, by the processor, a dwell-time for the item based at least on the one or more motion parameters; identifying, by the processor, a scan time anomaly for the item; and outputting a notification, by the processor, indicating a suspicious activity for the item, wherein the notification indicating the suspicious activity is based on the scan time anomaly.

2. The method of aspect 1, wherein the one or more motion parameters of the item comprise: a path trajectory of the item; or a velocity of the item.

3. The method of any of aspects 1-2, further comprising: detecting an initialization of a scan of a plurality of items at the POS device, wherein the item is one of the plurality of items.

4. The method of any of the preceding aspects, wherein determining the dwell-time for the item comprises: determining the dwell-time as an amount of time between a first time corresponding to the detecting of the entry of the item into the scanning area and a second time corresponding to detecting the item leaving the scanning area.

5. The method of any of the preceding aspects, wherein determining the dwell-time for the item comprises: assigning an item identifier to the item upon an entry of the item into the scanning area; calculating a total dwell-time as a time interval between an entry of a first of a plurality of items into the scanning area and an exit of a last of the plurality of items from the scanning area; determining an item count based on a POS transaction for the plurality of items; and determining a dwell-time for the item as the total dwell-time divided by the item count.

6. The method of any of the preceding aspects, wherein identifying the scan time anomaly comprises: comparing the dwell-time for the item against a dwell-time threshold; determining that the dwell-time for the item is greater than the dwell-time threshold; and identifying the scan time anomaly based on determining that the dwell-time for the item is greater than the dwell-time threshold.

7. The method of aspect 6, wherein the dwell-time threshold is based on one or a combination of: a type or category of the item; a size of the item; a weight of the item; or an identifier of a person operating the POS.

8. The method of any of the preceding aspects, further comprising: determining a frequency of scan time anomalies among a plurality of POS transactions based on a category of the item corresponding to the scan time anomalies; and wherein outputting the notification indicating the suspicious activity further includes identifying an aisle or a geographical area of a store corresponding to the category of the item.

9. The method of any of the preceding aspects, further comprising: determining, in response to identifying the scan time anomaly, a customer identification of a customer associated with a POS transaction corresponding to the scan time anomaly; and storing the customer identification of the customer.

10. The method of aspect 9, further comprising: generating a second notification indicating a presence of the customer in one or more areas of a store.

11. The method of any of the preceding aspects, wherein identifying the scan time anomaly comprises: monitoring for detection of a synchronization signal from a scanner based on the entry of the item into the scanning area; and generating the scan time anomaly based on lack of detection of the synchronization signal.

12. The method of aspect 11, wherein the synchronization signal comprises at least one of a sensor-detectable output or a synchronization signal message from the scanner.

13. An apparatus for determining losses at a point of sale (POS) device comprising a memory and a processor in communication with the memory and configured to perform the method of any of aspects 1-12.

14. An apparatus for determining losses at a point of sale (POS) device comprising one or more means for performing the method of any of aspects 1-12.

15. A computer-readable medium storing instructions for determining losses at a point of sale (POS) device, wherein the instructions are executable by a processor to perform the method of any of aspects 1-12.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of determining losses at a point of sale (POS) device, comprising:
- receiving, by a processor from an imaging device, a video feed of a scanning area;
- detecting, by the processor, an entry of an item into the scanning area;
- identifying, by the processor, one or more motion parameters of the item based on the video feed;
- determining, by the processor, a dwell-time for the item based at least on the one or more motion parameters;
- detecting, by the processor, a receipt of a synchronization signal captured from the imaging device that is emitted from a scanner of the POS device during the dwell-time;
- identifying, by the processor, a scan time anomaly for the item based at least in part on lack of receipt of the synchronization signal captured from the imaging device that is emitted from the scanner of the POS device during the dwell-time indicating the item being unscanned by the scanner during the dwell-time;
- determining a frequency of scan time anomalies among a plurality of POS transactions based on a category of the item corresponding to the scan time anomalies; and
- outputting a notification, by the processor, indicating a suspicious activity for the item, wherein the notification indicating the suspicious activity is based on the scan time anomaly, and wherein the notification comprises an alert message that identifies an aisle or a geographical area of a store corresponding to the category of the item.

2. The method of claim 1, wherein the one or more motion parameters of the item comprise:
- a path trajectory of the item; or
- a velocity of the item.

3. The method of claim 1, further comprising:
- detecting an initialization of a scan of a plurality of items at the POS device, wherein the item is one of the plurality of items.

4. The method of claim 1, wherein determining the dwell-time for the item comprises:
- determining the dwell-time as an amount of time between a first time corresponding to detecting of the entry of the item into the scanning area and a second time corresponding to detecting the item leaving the scanning area.

5. The method of claim 1, wherein determining the dwell-time for the item comprises:

assigning an item identifier to the item upon an entry of the item into the scanning area;

calculating a total dwell-time as a time interval between an entry of a first of a plurality of items into the scanning area and an exit of a last of the plurality of items from the scanning area;

determining an item count based on a POS transaction for the plurality of items; and determining a dwell-time for the item as the total dwell-time divided by the item count.

6. The method of claim 1, wherein identifying the scan time anomaly comprises:

comparing the dwell-time for the item against a dwell-time threshold;

determining that the dwell-time for the item is greater than the dwell-time threshold; and identifying the scan time anomaly based on determining that the dwell-time for the item is greater than the dwell-time threshold.

7. The method of claim 6, wherein the dwell-time threshold is based on one or a combination of:

a type of the item or the category of the item;

a size of the item;

a weight of the item; or an identifier of a person operating the POS device.

8. The method of claim 1, further comprising:

determining, in response to identifying the scan time anomaly, a customer identification of a customer associated with a POS transaction corresponding to the scan time anomaly; and storing the customer identification of the customer.

9. The method of claim 8, further comprising:

generating a second notification indicating a presence of the customer in one or more areas of a store.

10. The method of claim 1, wherein identifying the scan time anomaly comprises:

monitoring for detection of the synchronization signal from the scanner based on the entry of the item into the scanning area; and generating the scan time anomaly based on lack of detection of the synchronization signal.

11. The method of claim 10, wherein the synchronization signal comprises at least one of a sensor-detectable output or a synchronization signal message from the scanner.

12. An apparatus for determining losses at a point of sale (POS) device, comprising:

a memory; and a processor communicatively coupled with the memory and configured to:

receive, from an imaging device, a video feed of a scanning area;

detect an entry of an item into the scanning area;

identify one or more motion parameters of the item based on the video feed;

determine a dwell-time for the item based at least on the one or more motion parameters;

detect a receipt of a synchronization signal captured from the imaging device that is emitted from a scanner of the POS device during the dwell-time;

identify a scan time anomaly for the item based at least in part on lack of the receipt of the synchronization signal captured from the imaging device that is emitted from a scanner of the POS device during the dwell-time indicating the item being unscanned by the scanner during the dwell-time;

determine a frequency of scan time anomalies among a plurality of POS transactions based on a category of the item corresponding to the scan time anomalies; and output a notification indicating a suspicious activity for the item, wherein the notification indicating the suspicious activity is based on the scan time anomaly, and wherein the notification comprises an alert message that identifies an aisle or a geographical area of a store corresponding to the category of the item.

13. The apparatus of claim 12, wherein the one or more motion parameters of the item comprise:

a path trajectory of the item; or a velocity of the item.

14. The apparatus of claim 12, wherein the processor is further configured to:

detect an initialization of a scan of a plurality of items at the POS device, wherein the item is one of the plurality of items.

15. The apparatus of claim 12, wherein to determine the dwell-time for the item comprises to:

determine the dwell-time as an amount of time between a first time corresponding to detecting of the entry of the item into the scanning area and a second time corresponding to detect the item leaving the scanning area.

16. The apparatus of claim 12, wherein to determine the dwell-time for the item comprises to:

assign an item identifier to the item upon an entry of the item into the scanning area;

calculate a total dwell-time as a time interval between an entry of a first of a plurality of items into the scanning area and an exit of a last of the plurality of items from the scanning area;

determine an item count based on a POS transaction for the plurality of items; and determine a dwell-time for the item as the total dwell-time divided by the item count.

17. The apparatus of claim 12, wherein to identify the scan time anomaly comprises to:

compare the dwell-time for the item against a dwell-time threshold;

determine that the dwell-time for the item is greater than the dwell-time threshold; and identify the scan time anomaly based on determining that the dwell-time for the item is greater than the dwell-time threshold.

18. The apparatus of claim 17, wherein the dwell-time threshold is based on one or a combination of:

a type or category of the item;

a size of the item;

a weight of the item; or an identifier of a person operating the POS.

19. The apparatus of claim 12, wherein the processor is further configured to:

determine, in response to identify the scan time anomaly, a customer identification of a customer associated with a POS transaction corresponding to the scan time anomaly; and store the customer identification of the customer.

20. The apparatus of claim 19, wherein the processor is further configured to:

generate a second notification indicating a presence of the customer in one or more areas of a store.

21. The apparatus of claim 12, wherein to identify the scan time anomaly comprises to:

monitor for detection of the synchronization signal from the scanner based on the entry of the item into the scanning area; and generate the scan time anomaly based on lack of detection of the synchronization signal.

22. The apparatus of claim 21, wherein the synchronization signal comprises at least one of a sensor-detectable output or a synchronization signal message from the scanner.

23. A non-transitory computer-readable medium storing instructions for determining losses at a point of sale (POS) device, wherein the instructions are executable by a processor to:

receive, from an imaging device, a video feed of a scanning area;

detect an entry of an item into the scanning area;

identify one or more motion parameters of the item based on the video feed;

determine a dwell-time for the item based at least on the one or more motion parameters;

detect a receipt of a synchronization signal captured from the imaging device that is emitted from a scanner of the POS device during the dwell-time;

identify a scan time anomaly for the item based at least in part on lack of the receipt of the synchronization signal captured from the imaging device that is emitted from the scanner of the POS device during the dwell-time indicating the item being unscanned by the scanner during the dwell-time;

determine a frequency of scan time anomalies among a plurality of POS transactions based on a category of the item corresponding to the scan time anomalies; and output a notification indicating a suspicious activity for the item, wherein the notification indicating the suspicious activity is based on the scan time anomaly, and wherein the notification comprises an alert message that identifies an aisle or a geographical area of a store corresponding to the category of the item.

24. The method of claim 1, wherein the alert message comprises at least one of a generated audio message, a displayed visual message, or a transmitted message.

* * * * *